(12) United States Patent
Willey et al.

(10) Patent No.: US 12,093,124 B2
(45) Date of Patent: Sep. 17, 2024

(54) MULTI-LEVEL SIGNAL RECEPTION

(71) Applicant: Advanced Micro Devices, Inc., Santa Clara, CA (US)

(72) Inventors: Aaron D Willey, Hayward, CA (US); Karthik Gopalakrishnan, Cupertino, CA (US); Pradeep Jayaraman, San Jose, CA (US); Ramon Mangaser, Arlington, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 44 days.

(21) Appl. No.: 17/956,542

(22) Filed: Sep. 29, 2022

(65) Prior Publication Data

US 2024/0111618 A1   Apr. 4, 2024

(51) Int. Cl.
*G06F 11/07* (2006.01)

(52) U.S. Cl.
CPC .......... *G06F 11/079* (2013.01); *G06F 11/073* (2013.01)

(58) Field of Classification Search
CPC .............................. G06F 11/079; G06F 11/073
See application file for complete search history.

(56) References Cited

U.S. PATENT DOCUMENTS

| | | | |
|---|---|---|---|
| 2007/0171714 A1* | 7/2007 | Wu | G06F 11/1072 714/E11.038 |
| 2007/0171730 A1* | 7/2007 | Ramamoorthy | H03M 13/1515 365/185.33 |
| 2008/0159019 A1 | 7/2008 | Sutardja | |
| 2015/0207574 A1* | 7/2015 | Schoen | G01R 31/3171 375/224 |
| 2015/0309873 A1 | 10/2015 | Yoon et al. | |
| 2018/0278405 A1* | 9/2018 | Yao | H04L 7/0334 |
| 2020/0249714 A1 | 8/2020 | Cai et al. | |
| 2020/0278908 A1 | 9/2020 | Schaefer et al. | |
| 2022/0188013 A1 | 6/2022 | Woo et al. | |
| 2022/0300188 A1* | 9/2022 | Karim | H03F 3/45179 |
| 2022/0400449 A1* | 12/2022 | Mori | H04B 1/0007 |
| 2023/0199158 A1* | 6/2023 | Tsutsui | H04N 9/3185 353/69 |

OTHER PUBLICATIONS

International Search Report and Written Opinion for International Application No. PCT/US2023/033588, mailed Jan. 18, 2024, 7 pages.

\* cited by examiner

*Primary Examiner* — Samir W Rizk
(74) *Attorney, Agent, or Firm* — Polansky & Associates, P.L.L.C.; Paul J. Polansky (57) ABSTRACT

A method for receiving a multi-level error signal having more than two logic levels includes oversampling the multi-level error signal to provide sampled symbols, wherein a first level of the multi-level error signal indicates no error, and second and third levels of the multi-level error signal indicate first and second error conditions, respectively. The sampled signals are de-serialized to provide sets of symbols. A start of a symbol period is determined in response to detecting that a given sample is different from a prior sample, and the prior sample indicates no error. The sets of symbols are filtered to provide corresponding output symbols based on the start.

20 Claims, 6 Drawing Sheets

MULTI-LEVEL SIGNAL RECEPTION

BACKGROUND

Modern dynamic random-access memory (DRAM) provides high memory bandwidth by increasing the speed of data transmission on the bus connecting the DRAM and one or more data processors, such as graphics processing units (GPUs), central processing units (CPUs), and the like. DRAM is typically inexpensive and high density, thereby enabling large amounts of DRAM to be integrated per device. Most DRAM chips sold today are compatible with various double data rate (DDR) DRAM standards promulgated by the Joint Electron Devices Engineering Council (JEDEC). Typically, several DDR DRAM chips are combined onto a single printed circuit board substrate to form a memory module that can provide not only relatively high speed but also scalability. However, while these enhancements have improved the speed of DDR memory used for computer systems' main memory, further improvements are desirable.

One type of DDR DRAM, known as graphics double data rate (GDDR) memory, has pushed the boundaries of data transmission rates to accommodate the high bandwidth needed for graphics applications. As new GDDR standards are developed, they tend to support higher data rates. However, operating at these higher data rates generally requires improved processes for training the transmission and reception circuitry of the data link. Employing more than two signaling levels on the signaling link also complicates the link training process.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A method for receiving a multi-level error signal having more than two logic levels includes oversampling the multi-level error signal to provide sampled symbols, wherein a first level of the multi-level error signal indicates no error, and second and third levels of the multi-level error signal indicate first and second error conditions, respectively. The sampled signals are de-serialized to provide sets of symbols. A start of a symbol period is determined in response to detecting that a given sample is different from a prior sample, and the prior sample indicates no error. The sets of symbols are filtered to provide corresponding output symbols based on the start.

A receiver for receiving a multi-level error signal having more than two logic levels includes an input circuit and a filter and alignment circuit. The input circuit has a data input for receiving the multi-level error signal, a first clock input for receiving a first clock signal at a first clock rate higher than a symbol rate of the multi-level error signal, and an output for providing sets of symbols at a second clock rate lower than the first clock rate. The filter and alignment circuit has an input coupled to the output of the input circuit, and an output for providing output symbols. The filter and alignment circuit determines a start of a symbol period in response to detecting that a given sampled signal is different from a prior sampled signal, and the prior sampled signal indicates no error, and filters the sets of symbols to provide corresponding output symbols based on the start of the symbol period.

A data processing system includes a data processor and a memory coupled to the data processor that outputs a multi-level error signal having more than two logic levels in response to detecting an error in a communication with the data processor. The data processor includes a physical interface circuit coupled to the memory. The physical interface circuit includes an input circuit and a filter and alignment circuit. The input circuit has a data input for receiving the multi-level error signal, a first clock input for receiving a first clock signal at a first clock rate higher than a symbol rate of the multi-level error signal, and an output for providing sets of symbols at a second clock rate lower than the first clock rate. The filter and alignment circuit has an input coupled to the output of the input circuit, and an output for providing output symbols. The filter and alignment circuit determines a start of a symbol period in response to detecting that a given sampled signal is different from a prior sampled signal, and the prior sampled signal indicates no error, and filters the sets of symbols to provide corresponding output symbols based on the start of the symbol period.

Figure 1:
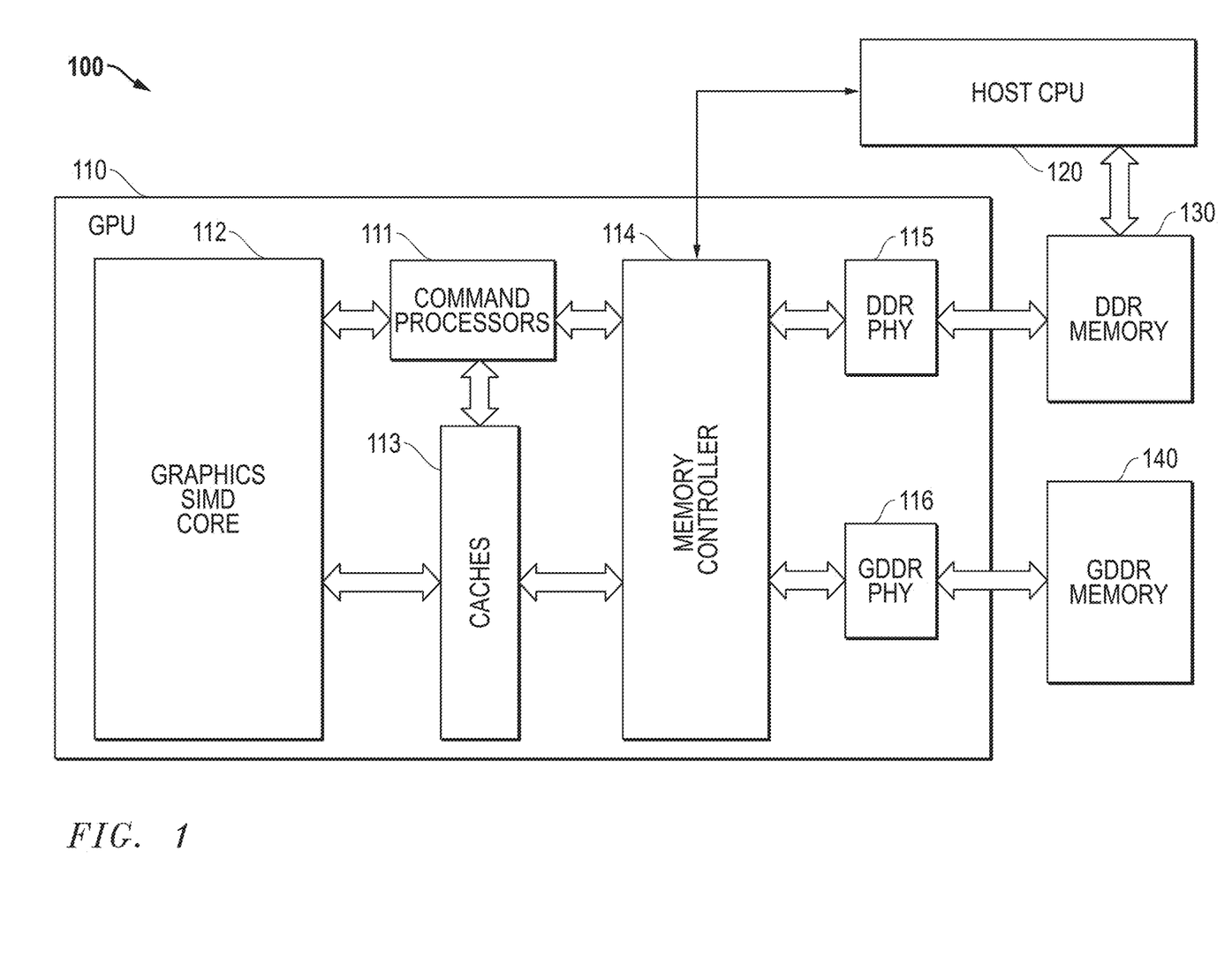
FIG. 1 illustrates in block diagram for a data processing system according to some embodiments.

FIG. 1 illustrates in block diagram for a data processing system 100 according to some embodiments. Data processing system 100 includes generally a data processor in the form of a graphics processing unit (GPU) 110, a host central processing unit (CPU) 120, a double data rate (DDR) memory 130, and a graphics DDR (GDDR) memory 140.

GPU 110 is a discrete graphics processor that has extremely high performance for optimized graphics processing, rendering, and display, but requires a high memory bandwidth for performing these tasks. GPU 110 includes generally a set of command processors 111, a graphics single instruction, multiple data (SIMD) core 112, a set of caches 113, a memory controller 114, a DDR physical interface circuit (DDR PHY) 117, and a GDDR PHY 118.

Command processors 111 are used to interpret high-level graphics instructions such as those specified in the OpenGL programming language. Command processors 111 have a bidirectional connection to memory controller 114 for receiving high-level graphics instructions such as OpenGL instructions, a bidirectional connection to caches 113, and a bidirectional connection to graphics SIMD core 112. In response to receiving the high-level instructions, command processors issue low-level instructions for rendering, geometric processing, shading, and rasterizing of data, such as frame data, using caches 113 as temporary storage. In response to the graphics instructions, graphics SIMD core 112 performs low-level instructions on a large data set in a massively parallel fashion. Command processors 111 and caches 113 are used for temporary storage of input data and output (e.g., rendered and rasterized) data. Caches 113 also have a bidirectional connection to graphics SIMD core 112, and a bidirectional connection to memory controller 114.

Memory controller 114 has a first upstream port connected to command processors 111, a second upstream port connected to caches 113, a first downstream bidirectional port to DDR PHY 117, and a second downstream bidirectional port to GDDR PHY 118. As used herein, "upstream" ports are on a side of a circuit toward a data processor and away from a memory, and "downstream" ports are in a direction away from the data processor and toward a memory. Memory controller 114 controls the timing and sequencing of data transfers to and from DDR memory 130 and GDDR memory 140. DDR and GDDR memory have asymmetric accesses, that is, accesses to open pages in the memory are faster than accesses to closed pages. Memory controller 114 stores memory access commands and processes them out-of-order for efficiency by, e.g., favoring accesses to open pages, while observing certain quality-of-service objectives.

DDR PHY 117 has an upstream port connected to the first downstream port of memory controller 114, and a downstream port bidirectionally connected to DDR memory 130. DDR PHY 117 meets all specified timing parameters of the version of DDR memory 130, such as DDR version five (DDR5), and performs timing calibration operations at the direction of memory controller 114. Likewise, GDDR PHY 118 has an upstream port connected to the second downstream port of memory controller 114, and a downstream port bidirectionally connected to GDDR memory 140. GDDR PHY 118 meets all specified timing parameters of the version of GDDR memory 140, and performs timing calibration operations at the direction of memory controller 114. GDDR memory 140 includes a set of mode registers 141 programmable over the GDDR PHY 118 to configure GDDR memory 140 for operation.

In operation, data processing system can be used as a graphics card or accelerator because of the high bandwidth graphics processing performed by graphics SIMD core 112. Host CPU 120, running an operating system or an application program, sends graphics processing commands to GPU 110 through DDR memory 130, which serves as a unified memory for GPU 110 and host CPU 120. It may send the commands using, for example, as OpenGL commands, or through any other host CPU to GPU interface. OpenGL was developed by the Khronos Group, and is a cross-language, cross-platform application programming interface for rendering 2D and 3D vector graphics. Host CPU 120 uses an application programming interface (API) to interact with GPU 110 to provide hardware-accelerated rendering.

Data processing system 100 uses two types of memory. The first type of memory is DDR memory 130, and is accessible by both GPU 110 and host CPU 120. As part of the high performance of graphics SIMD core 112, GPU 110 uses a high-speed graphics double data rate (GDDR) memory. Because of the high bandwidth, GDDR is suitable for very high-performance graphics operations.

Figure 2:
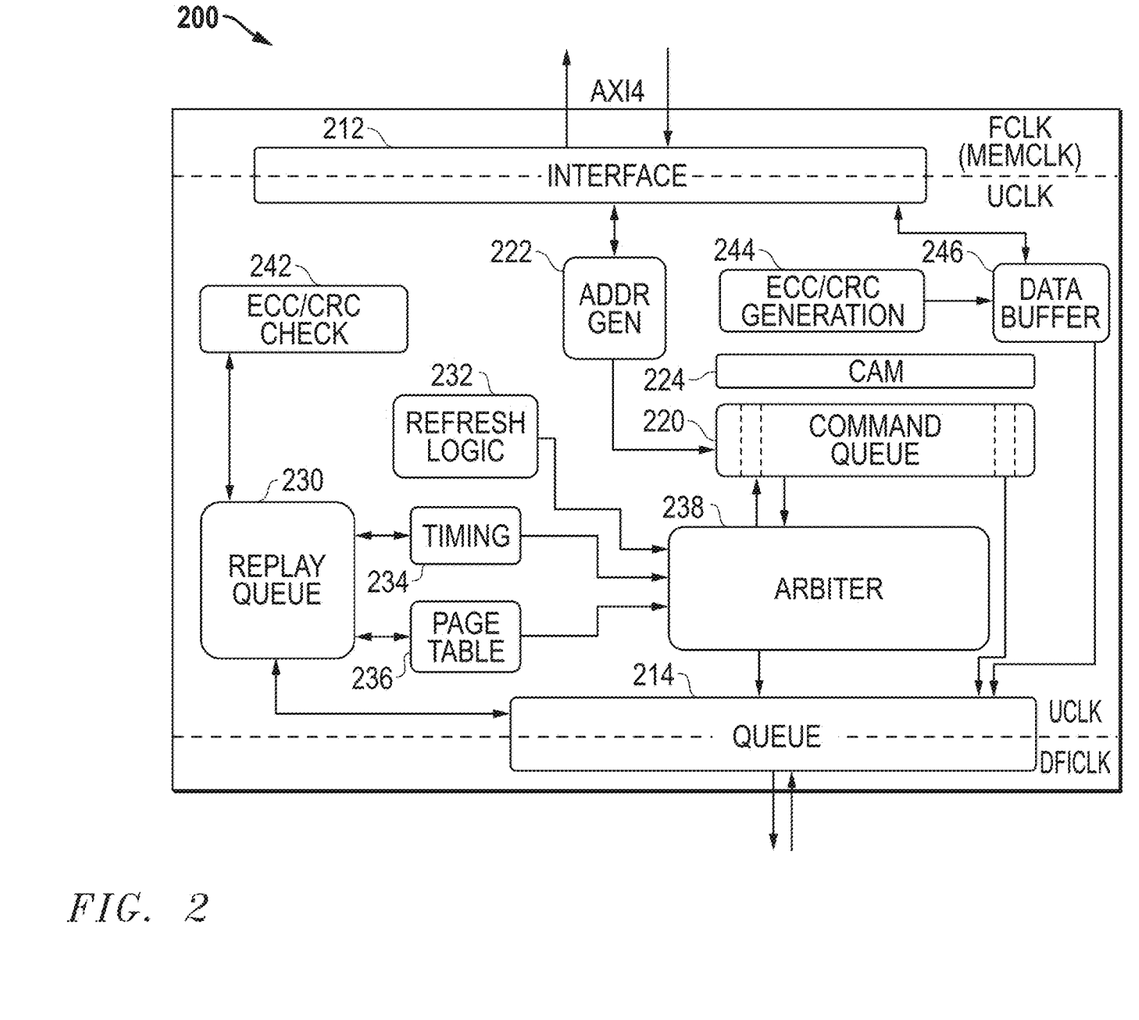
FIG. 2 illustrates in block diagram form a memory controller that is suitable for use in the GPU of FIG. 1.

FIG. 2 illustrates in block diagram form a memory controller 200 that is suitable for use in an APU like that of FIG. 1. Memory controller 200 includes generally an interface 212, a memory interface queue 214, a command queue 220, an address generator 222, a content addressable memory (CAM) 224, replay control logic 231 including a replay queue 230, a refresh control logic block 232, refresh control logic 232, a timing block 234, a page table 236, an arbiter 238, an error correction code (ECC) check circuit 242, an ECC generation block 244, and a data buffer 246.

Interface 212 has a first bidirectional connection to data fabric over an external bus, and has an output. In memory controller 200, this external bus is compatible with the advanced extensible interface version four specified by ARM Holdings, PLC of Cambridge, England, known as "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to a DFICLK domain associated with the DFI interface.

Address generator 222 decodes addresses of memory access requests received from the data fabric over the AXI4 bus. The memory access requests include access addresses in the physical address space represented in a normalized format. Address generator 222 converts the normalized addresses into a format that can be used to address the actual memory devices in the memory system, as well as to efficiently schedule related accesses. This format includes a region identifier that associates the memory access request with a particular rank, a row address, a column address, a bank address, and a bank group. On startup, the system BIOS queries the memory devices in memory system to determine their size and configuration, and programs a set of configuration registers associated with address generator 222. Address generator 222 uses the configuration stored in the configuration registers to translate the normalized addresses into the appropriate format. Command queue 220 is a queue of memory access requests received from the memory accessing agents in data processing system 100, such as graphics SIMD core 112. Command queue 220 stores the address fields decoded by address generator 222 as well other address information that allows arbiter 238 to select memory accesses efficiently, including access type and quality of service (QoS) identifiers. CAM 224 includes information to enforce ordering rules, such as write after write (WAW) and read after write (RAW) ordering rules. Command queue 220 is a stacked command queue including multiple entry stacks each containing multiple command entries, in this embodiment 32 entry stacks of four entries each, as further described below.

Error correction code (ECC) generation block 244 determines the ECC of write data to be sent to the memory. This ECC data is then added to the write data in data buffer 246. ECC check circuit 242 checks the received ECC against the incoming ECC.

Replay queue 230 is a temporary queue for storing selected memory accesses picked by arbiter 238 that are awaiting responses, such as address and command parity responses. Replay control logic 231 accesses ECC check circuit 242 to determine whether the returned ECC is correct or indicates an error. Replay control logic 231 initiates and controls a replay sequence in which accesses are replayed in the case of a parity or ECC error of one of these cycles. Replayed commands are placed in the memory interface queue 214.

Refresh control logic 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh control logic 232 generates refresh commands periodically and in response to designated conditions to prevent data errors caused by leaking of charge off storage capacitors of memory cells in DRAM chips. Refresh control logic 232 includes an activate counter 248, which in this embodiment has a counter for each memory region which counts a rolling number of activate commands sent over the memory channel to a memory region. The memory regions are memory banks in some embodiments, and memory sub-banks in other embodiments as further discussed below. In addition, refresh control logic 232 periodically calibrates ZQ to prevent mismatch in on-die termination resistance due to thermal changes in the system.

Arbiter 238 is bidirectionally connected to command queue 220 and is the heart of memory controller 200, performing intelligent scheduling of accesses to improve the usage of the memory bus. In this embodiment, arbiter 238 includes a grain address translation block 240 for translating commands and addresses for fine-grained memory accesses in multiple modes, as further described below. In some embodiments, such functions may be performed by address generator 222. Arbiter 238 uses timing block 234 to enforce proper timing relationships by determining whether certain accesses in command queue 220 are eligible for issuance based on DRAM timing parameters. For example, each DRAM has a minimum specified time between activate commands, known as "$t_{RC}$". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230. Arbiter 238 includes a single command input for each entry stack of command queue 220, and selects commands therefrom to schedule for dispatch through memory interface queue 214 to the DRAM channel.

In response to write memory access requests received from interface 212, ECC generation block 244 computes an ECC according to the write data. Data buffer 246 stores the write data and ECC for received memory access requests. It outputs the combined write data/ECC to memory interface queue 214 when arbiter 238 picks the corresponding write access for dispatch to the memory channel.

Memory controller 200 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers (not shown) store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as quality of service (QoS) requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 normally keeps pages open in different banks until they are required to be precharged prior to selecting a different page.

Figure 3:
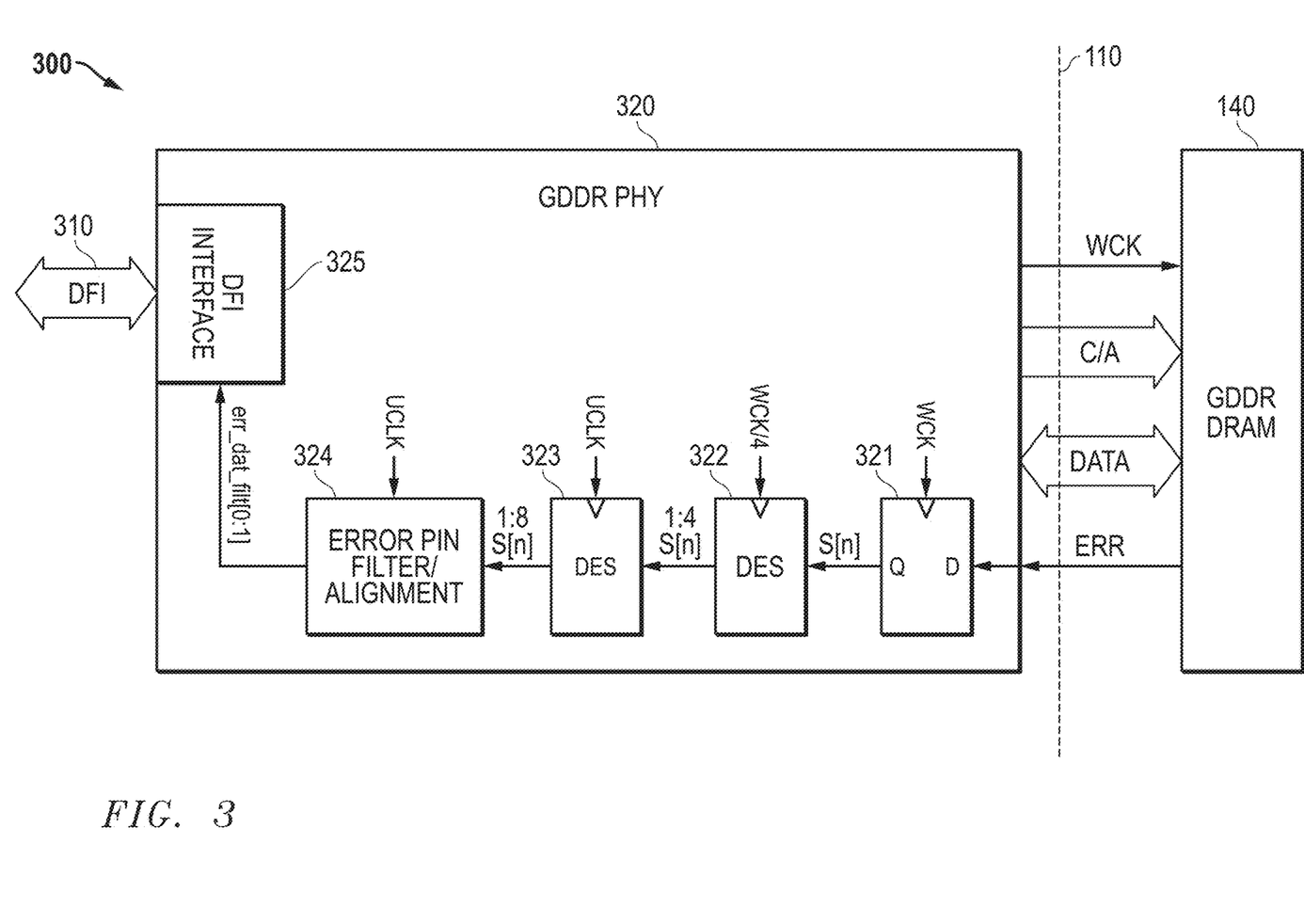
FIG. 3 illustrates in block diagram form a memory controller PHY capable of performing multi-level signal reception according to some embodiments.

FIG. 3 illustrates in block diagram form a memory controller PHY 300 capable of performing multi-level signal reception according to some embodiments. PHY 300 is capable of being used as GDDR PHY 116 of FIG. 1 and performs multi-level signal reception on the ERR pin. GDDR PHY 320 interfaces to GDDR memory 140 using a variety of signals. Significantly, signal timing is governed by a write clock signal labelled "WCK", which is a synchronous clock signal generated by GPU 110 and provided by GPU 110 to GDDR memory 140. GDDR PHY 320 provides command and address signals labelled "C/A" during read and write accesses to GDDR DRAM 140. GDDR PHY 320 also has a bidirectional data bus labelled "DATA" for transmitting data to GDDR DRAM 140 during write cycles and receiving data from GDDR memory 140 during read cycles. Finally, GDDR PHY 320 receives an error signal labelled "ERR" from GDDR memory 140 to indicate a C/A parity error and a write CRC error.

The ERR signal is a multi-level signal, i.e., a signal having more than two logic states. In some embodiments, the ERR signal is a four-level pulse-amplitude modulated (PAM-4) signal having four logic levels, generally designated the "+3 level" for a high voltage with respect to the power supply voltage, the "+1 level" for a medium high voltage with respect to the power supply voltage, the "−1 level" for a medium low voltage with respect to the power supply voltage, and the "−3 level" for a low voltage with respect to the power supply voltage. In other embodiments, the ERR signal is a three-level pulse-amplitude modulated (PAM-3) signal having three logic levels, generally designated the "+1 level" for a high voltage with respect to the power supply voltage, the "0 level" for a medium voltage with respect to the power supply voltage, and the "−1 level" for a low voltage with respect to the power supply voltage. It should be apparent from this discussion, however, that the current techniques are applicable to other multi-level signal schemes besides PAM-4 and PAM-3.

In the illustrated examples, GDDR memory 140 provides the ERR signal after the end of the reception of data during a write transaction, and the ERR signal changes at one-quarter of the WCK clock rate, i.e., GDDR memory 140 holds the ERR pin stable for a length of 4 WCK pulses. The WCK signal routing and loading also differs from the DATA routing and loading. According to conventional DDR DRAM techniques, the ERR signal would be trained so that its timing skew with respect to the WCK signal could be determined and the WCK signal could be delayed to capture the ERR pin value. However, separate ERR pin retraining is time consuming and disruptive to system operations when it is periodically re-trained during operation.

The inventors, however, have developed a technique that does not train the WCK-to-ERR signal skew at startup or periodically during operation. Moreover, the technique uses a relatively small amount of digital circuitry and thus does not significantly add to integrated circuit cost. The technique is robust for a large spectrum of signal routings.

As shown in FIG. 3, PHY 320 has a latch 321, a deserializer 322, a deserializer 323, an error pin filter and alignment circuit 324, and an interface circuit 325. Latch 321 is shown with a data input labelled "D" for receiving the ERR signal, a clock input for receiving the WCK signal, and an output for providing a series of multi-bit sampled symbols labelled "S[n]", in which n is a time index. For example, S[n] could be a binary signal representative of the multi-bit PAM-4 signal, in which the +3 level is encoded as 11b, the +1 level is encoded as 10b, the −1 level is encoded as 01b, and the −3 level is encoded as 00b. Deserializer 322 is a circuit having an input connected to the output of latch 321, a clock input for receiving a clock signal labelled "WCK/4", and an output for providing a series of symbols labelled "1:4 S[n]". Deserializer 323 has an input connected to the output of latch 321, a clock input for receiving a clock signal labelled "UCK", and an output for providing a series of symbols labelled "1:8 S[n]". UCK is a clock signal for memory controller 114, which is generally at a rate of one-half of the WCK/4 rate. Note that FIG. 3 shows two separate deserializers 322 and 323 to provide a 1:8 deserialization operation, but the deserialization function could be performed using different circuitry that is represented by a single 1:8 deserialization circuit. Error pin filter and alignment circuit 324 has an input connected to the output of deserializer 323, and an output for providing a filtered signal labelled "err_dat_filt[0:1]". Interface circuit 325 has an input for receiving the error_pin_filt[0:1] signal, other inputs and outputs not shown in FIG. 3, and a bidirectional connection to memory controller 114 over a bus labelled "DFI". DFI is a standard interface allowing the standard connection of DRAM memory controllers to memory controller PHY circuits, and thus a process-independent DRAM controller to a process-specific PHY circuit.

GDDR PHY 320 allows the correct reception of the ERR signal without the need for phase training. It combines the symbols encoded on the multi-level ERR signal into sets of symbols during an evaluation window. The evaluation window is wide enough to correctly capture at least one full symbol. Latch 321, deserializer 322, and deserializer 323 form an input circuit. Latch 321 uses the relatively fast WCK signal to oversample the ERR signal line. The symbols then are deserialized in a circuit including deserializers 322 and 323 that provides sets of symbols at a lower clock rate, namely the UCLK rate. There are eight symbols that are provided to error pin filter and alignment circuit 324.

Error pin filter and alignment circuit 324 first determines the start of a symbol period. It does so in response to detecting that a given sampled signal is different from a prior sampled signal in one of the sets of symbols, and the prior sampled signal indicates no error. In the example of PAM-4 signaling, assume the +3 level indicates no error, the +1 level indicates that GDDR memory 140 detected a write CRC error but not a command and address parity error, the −1 level indicates that GDDR memory 140 detected a command and address parity error but no write CRC error, and the −3 level indicates that GDDR memory 140 detected both a command and address error and a write CRC error. Thus, the first condition is met when a given sample and a prior sample are different, for example, the prior sample is +3 indicating no error, and the given sample is +1 indicating a write CRC error but no C/A parity error. The second condition is that the prior sampled signal indicates no error. Thus, if the prior sample were +1 and the current sample were +3, then error pin filter and alignment circuit 324 would not detect the start of the period at this time because it indicates the end, not the start, of the error signal. In pseudo-code, this relationship can be expressed as shown in Equation [1]:

If $S[n]!=S[n-1]$ and $S[n-1]=+3$, then reset offset pointer for start of error signal  [1]

In this case, $Filt\_idx = n \bmod 4$  [2]

in which n is the symbol index with reference to the samples in the current UCLK period. Note that an integration filter could be added to this filter index value, because this value is not expected to change rapidly, but only slowly as temperature drifts during operation, or if the WCK phase is updated.

Once error pin filter and alignment circuit 324 determines the offset pointer for the start of the symbol, then it filters the sets of symbols associated to provide the corresponding output symbols to the memory controller based on this starting point. In some embodiments, error pin filter and alignment circuit 324 performs two filtering functions. First, since there are four symbols starting from the offset, it discards the first and last symbols to take into account timing variations caused by the different clock rates, and uses at least one sample in between the first and last symbols with which to form the filtered symbol. In the example shown in FIG. 3, it would use the second and third symbols between the first and the last, fourth symbol to detect the error to be reported to the memory controller.

Second, it determines the most severe error indicated by any of the symbols in between the first symbol and the last symbol and forms the output symbol based on the most severe error. For the PAM-4 example, if the second symbol from the start were +1 and the third symbol from the start were −1, it would form the final symbol as −1 since the −1 symbol indicates both a write CRC error and a C/A parity error and thus is worse than a write CRC error alone. The pseudo-code for this operation is indicated by equation [3] below.

$$err\_dat\_filt[k] = \min(SB(4*k\_filt\_idx+1), SB[4*k*filt\_idx+2])$$  [3]

in which k represents the CK4 index, in which −1 indicates the four prior symbols from the previous UCLK cycle, 0 and 1 represent the first and second CK4 cycles of the current UCK data, respectively, filt_idx is the filtering index indicated by equation [2] above, and err_dat_filt represents the filtered version of the symbol data which will be sent to the memory controller By performing oversampling, symbol alignment, and symbol filtering, PHY 300 robustly determines error conditions on the multi-level ERR signal without the system disruption caused by training. It requires only a small amount of added circuitry and thus does not add significantly to system cost. Moreover, it tolerates wide variations in signal skew between the ERR symbol boundaries and the rising edge of the WCK/4 signal. Examples of the operation of GDDR PHY 320 will now be shown with respect to three timing examples.

Figure 4:
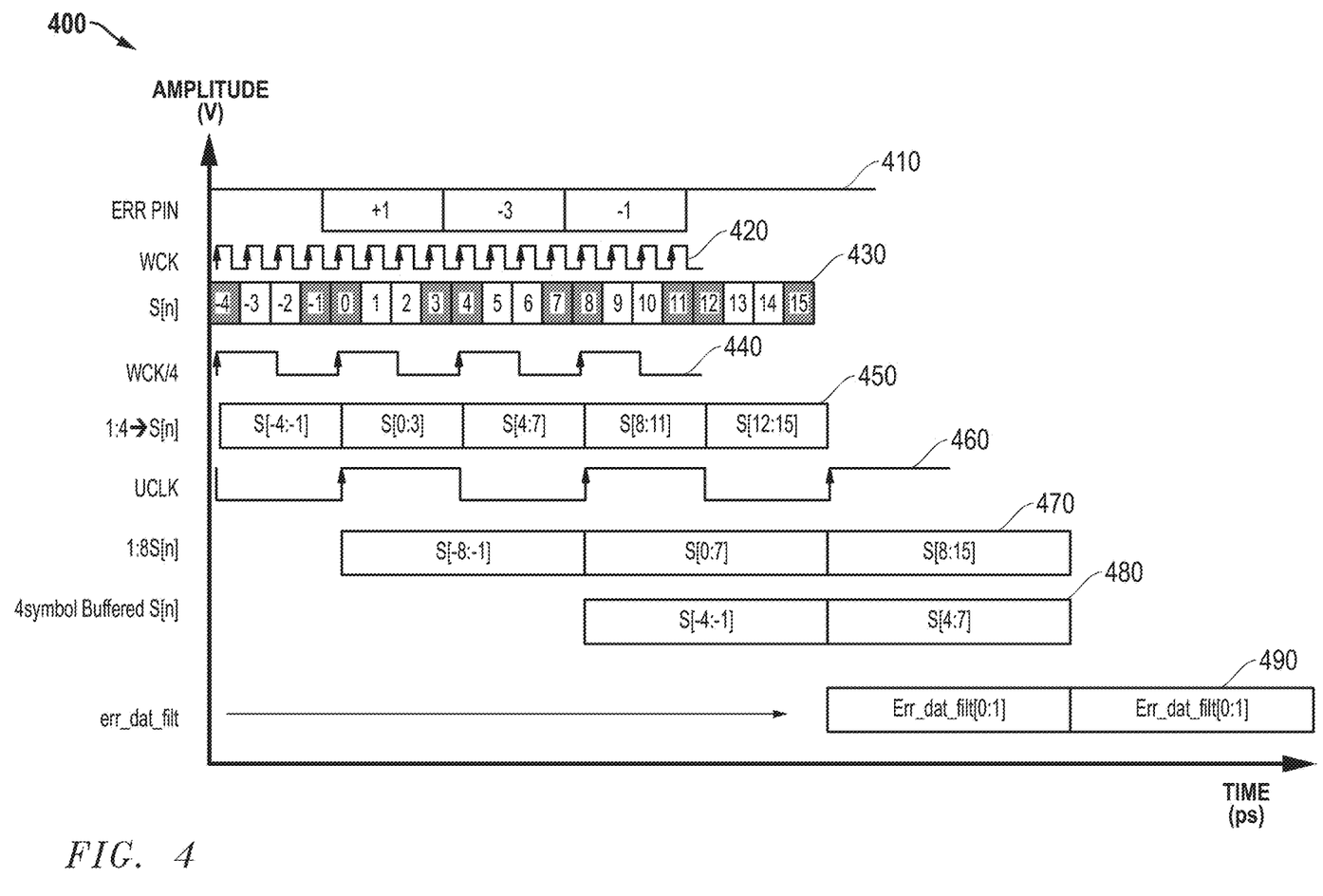
FIG. 4 shows a timing diagram illustrating the operation of the PHY of FIG. 3 when the multi-level signal is substantially aligned with a deserialization clock.

FIG. 4 shows a timing diagram 400 illustrating the operation of GDDR PHY 320 of FIG. 3 when the multi-level signal is substantially aligned with a deserialization clock. In timing diagram 400, the horizontal axis represents time in picoseconds (ps), and the vertical axis represents the amplitude of various signals in volts (V). Timing diagram 400 shows waveforms of various signals of interest, including a waveform 410 for the ERR signal, a waveform 420 for the WCK signal, a waveform 430 showing the symbol S[n] time of the ERR signal, a waveform 440 showing the WCK/4 signal, a waveform 450 showing deserialized sets of symbols 1:4 S[n] collected over four WCK periods, a waveform 460 showing the memory controller clock signal UCLK, a waveform 470 showing the 1:8 S[n] collected over eight WCK periods, a waveform 480 showing buffered 1:8 S[m]

symbols, and a waveform 490 showing the err_dat_filt[0:1] signal provided to the memory controller over the DFI interface.

Each symbol S[n] has an associated number around the start of the first symbol, shown in timing diagram 400 as a +1 symbol. The symbol S[n] starts at 0 and proceeds to 15 with increasing time, and precedes in reverse order using negative numbers for decreasing time, and as shown in timing diagram 400 includes −1, −2, −3, and −4 samples. Timing diagram 400 shows the condition in which the ERR signal edge is substantially aligned with the rising edge of the WCK/4 signal. Latch 321 samples the ERR signal at the rising edge of the WCK signal to form the first sampled symbol S[0], and samples the last sampled signal of the ERR signal to form sampled symbol S[3]. Since they are near the transition of the ERR signal, sampled signals S[0] and S[3] are shown with a gray background, whereas sampled symbols S[2] and S[3] are separated from the transitions of the ERR signal and shown with a white background.

Deserializer 322 samples the S[n] symbols output from latch 321 using the WCK/4 clock, and therefore samples a set of four symbols sown in FIG. 3 as "S[0:3]". Deserializer 323 then further samples S[0:3] using the UCLK signal, which is at half the frequency of the WCK/4 signal. These eight samples are labelled "1-8 S[n]". Waveform 480 shows 4-symbol buffered sets S[n] of symbols.

The symbol evaluation window is large enough to find the start of a symbol period even with indeterminate delay on the ERR pin. Error pin filter/alignment circuit 324 determines the start of the ERR signal symbol period, as noted above, by first detecting the change in symbols between two symbol periods (S[n] !=S[n−1]), and then determine that the earlier symbol indicates no error (e.g., S[n]=+3). As shown in timing diagram 400, the condition that (S[n]!=S[n−1]) occurs between sample −1 and sample 0. After it finds the alignment, error pin filter/alignment circuit 324 filters the values of the symbols by discarding the first and the fourth samples and using the worst error indicated by only the second and third samples of the group. For example, it determines the first ERR signal value by examining S[1] and S[2], which it determines to be +1. Next it determines the second ERR signal value by discarding S[4] and S[7] and examining S[5] and S[6], which it determines to be −3. Then it determines the third ERR signal value by discarding S[8] and S[11] and examining S[9] and S[10], which it determines to be −1. Finally, it determines the fourth ERR signal value by discarding S[12] and S[15] and examining S[13] and S[15], which it determines to be +3. It reports the condition of the ERR signal to the memory controller over DFI interface 310 as Err_dat_filt[0:1] which has the value pair +1, −3 and then the value pair −1, +3 as shown in waveform 490.

Figure 5:
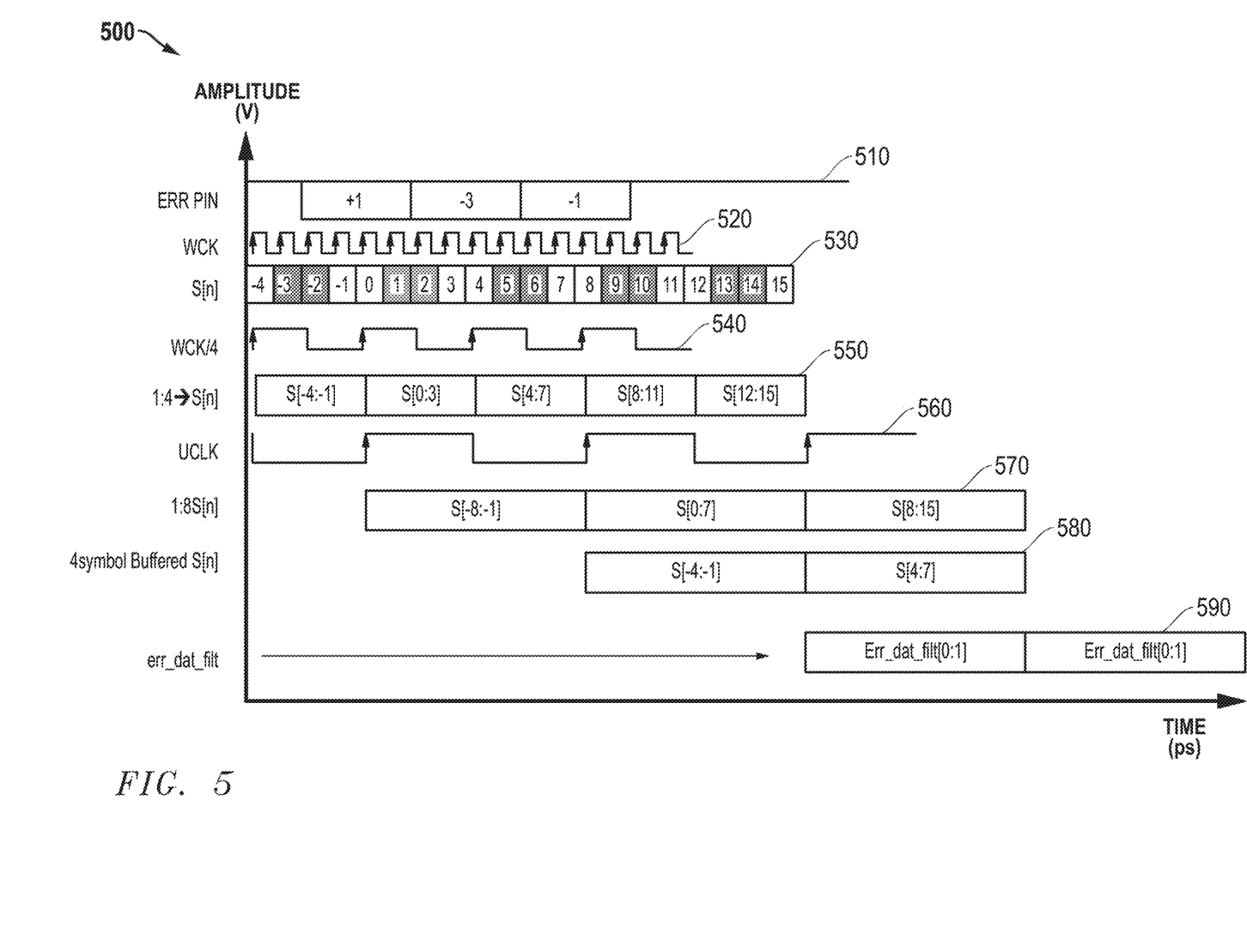
FIG. 5 shows a timing diagram illustrating the operation of the PHY of FIG. 3 when the multi-level signal is advanced with respect to the deserialization clock.

FIG. 5 shows a timing diagram 500 illustrating the operation of the PHY of FIG. 3 when the multi-level signal is advanced with respect to the deserialization clock. In timing diagram 500, the horizontal axis represents time in ps, and the vertical axis represents the amplitude of various signals in V. Timing diagram 500 shows waveforms of the same signals of interest as shown in timing diagram 400, including a waveform 510 for the ERR signal, a waveform 520 for the WCK signal, a waveform 530 showing the symbol S[n] time of the ERR signal, a waveform 540 showing the WCK/4 signal, a waveform 550 showing deserialized sets of symbols 1:4 S[n] collected over four WCK periods, a waveform 560 showing the memory controller clock signal UCLK, a waveform 570 showing the 1:8 S[n] collected over eight WCK periods, a waveform 580 showing buffered 1:8 S[n] symbols, and a waveform 590 showing the err_dat_filt[0:1] signal provided to the memory controller over the DFI interface.

As shown in timing diagram 500, error pin filter/alignment circuit 324 determines the start of the ERR signal symbol period, as noted above, by first detecting the change in symbols between two symbol periods (S[n] !=S[n−1]), and then determine that the earlier symbol indicates no error (e.g., S[n]=+3). As shown in timing diagram 400, the condition that (S[n]!=S[n−1]) occurs between sample −3 and sample −2. After it finds the alignment, error pin filter/alignment circuit 324 filters the values of the symbols by discarding the first and the fourth samples and using the worst error indicated by only the second and third samples of the group. For example, it determines the first ERR signal value by examining S[−1] and S[0], which it determines to be +1; the second ERR signal value by discarding S[2] and S[5] and examining S[3] and S[4], which it determines to be −3; the third ERR signal value by discarding S[6] and S[9] and examining S[7] and S[8], which it determines to be −1; and the fourth ERR signal value by discarding S[10] and S[13] and examining S[11] and S[12], which it determines to be +3. It reports the same ERR signal pattern in which Err_dat_filt[0:1] which has the value pair +1, −3 and then the value pair −1, +3 as shown in waveform 590.

Figure 6:
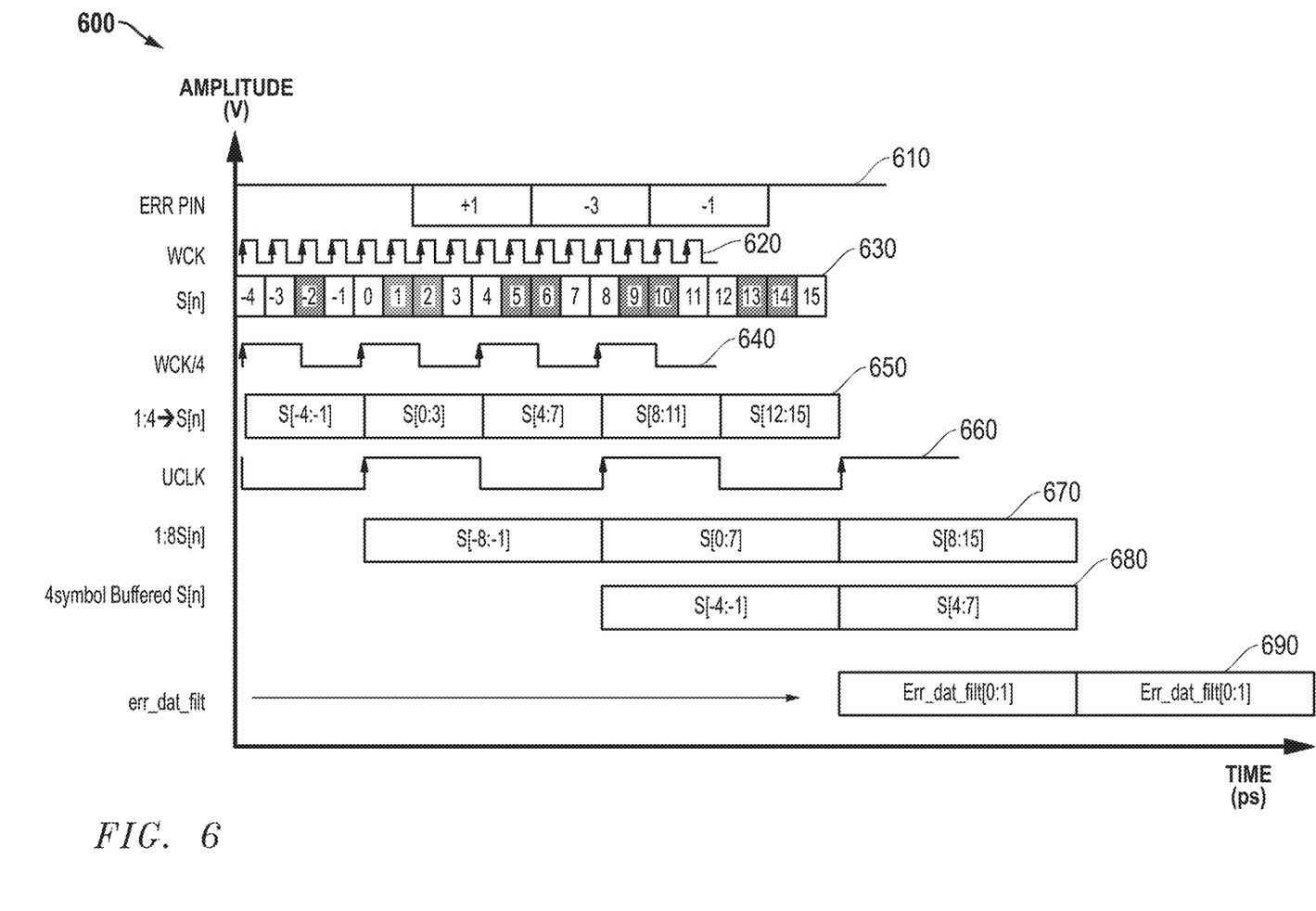
FIG. 6 shows a timing diagram illustrating the operation of the PHY of FIG. 3 when the multi-level signal is delayed with respect to the deserialization clock.

FIG. 6 shows a timing diagram illustrating the operation of the PHY of FIG. 3 when the multi-level signal is delayed with respect to the deserialization clock. In timing diagram 600, the horizontal axis represents time in ps, and the vertical axis represents the amplitude of various signals in V. Timing diagram 600 shows waveforms of the same signals of interest as shown in timing diagram 400, including a waveform 610 for the ERR signal, a waveform 620 for the WCK signal, a waveform 630 showing the symbol S[n] time of the ERR signal, a waveform 640 showing the WCK/4 signal, a waveform 650 showing deserialized sets of symbols 1:4 S[n] collected over four WCK periods, a waveform 660 showing the memory controller clock signal UCLK, a waveform 670 showing the 1:8 S[n] collected over eight WCK periods, a waveform 680 showing buffered 1:8 S[n] symbols, and a waveform 690 showing the err_dat_filt[0:1] signal provided to the memory controller over the DFI interface.

As shown in timing diagram 600, error pin filter/alignment circuit 324 determines the start of the ERR signal symbol period, as noted above, by first detecting the change in symbols between two symbol periods (S[n]!=S[n−1]), and then determine that the earlier symbol indicates no error (e.g., S[n]=+3). As shown in timing diagram 600, the condition that (S[n]!=S[n−1]) occurs between sample 1 and sample 2. After it finds the alignment, error pin filter/alignment circuit 324 filters the values of the symbols by discarding the first and the fourth samples and using the worst error indicated by only the second and third samples of the group. For example, it determines the first ERR signal value by examining S[3] and S[4], which it determines to be +1; the second ERR signal value by discarding S[6] and S[9] and examining S[7] and S[8], which it determines to be −3; the third ERR signal value by discarding S[10] and S[13] and examining S[11] and S[12], which it determines to be −1; and the fourth ERR signal value by discarding S[14] and S[17] (not sown in FIG. 6) and examining S[15] and S[16] (not shown in FIG. 6), which it determines to be +3. It reports the same ERR signal pattern in which Err_dat_filt [0:1] which has the value pair +1, −3 and then the value pair −1, +3 as shown in waveform 590.

Thus, timing diagrams 400, 500, and 600 show that GDDR PHY 320 provides a very robust reception of the ERR symbols without requiring calibration by tolerating a deviation of ±2 WCK periods. The circuit is relatively small and consumes only a small amount of power.

A receiver, a physical interface circuit, a memory device, or a data processor or any portions thereof, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the technique can be used with a variety of multi-level symbol encoding schemes, including PAM-3 and PAM-4. The specific clock signals used may vary in other embodiments. The deserialization operation may be performed with a variety of circuits and differing numbers of steps, such as divide by four followed by divide by two. It is applicable to a variety of systems, including GDDR memory systems or various versions thereof, or other similar memory systems. The error mapping to the multi-level signal can also vary in different embodiments. While the illustrated embodiment showed a graphics processing unit connected to a GDDR memory, the multi-level error signal filtering mechanism can be applied to other types of memory and to other types of data processors.

Accordingly, it is intended by the appended claims to cover all modifications of the disclosed embodiments that fall within the scope of the disclosed embodiments.

What is claimed is:

1. A method for receiving a multi-level error signal having more than two logic levels, comprising:
    oversampling the multi-level error signal to provide sampled symbols, wherein a first level of the multi-level error signal indicates no error, and second and third levels of the multi-level error signal indicate first and second error conditions, respectively;
    de-serializing said sampled symbols to provide sets of symbols;
    determining a start of a symbol period in response to detecting that a given sample is different from a prior sample, and said prior sample indicates no error; and
    filtering said sets of symbols to provide corresponding output symbols based on said start.

2. The method of claim 1, wherein said filtering comprises:
    discarding a first symbol at said start of said symbol period and a last symbol at an end of said symbol period; and
    forming a filtered symbol in response to at least one sample between said first symbol and said last symbol.

3. The method of claim 2, wherein:
    forming said filtered symbol comprises forming said filtered symbol in response to a plurality of symbols between said first symbol and said last symbol.

4. The method of claim 3, wherein:
    forming said filtered symbol further comprises forming said filtered symbol as a most severe error indicated by any of said plurality of symbols between said first symbol and said last symbol.

5. The method of claim 1, wherein:
    the multi-level error signal is a four-level pulse amplitude modulated (PAM-4) signal having a +3 logic level, a +1 logic level, a −1 logic level, and a −3 logic level, wherein said +3 logic level indicates no error.

6. The method of claim 1, wherein:
    the multi-level error signal is a three-level pulse amplitude modulated (PAM-3) signal having a +1 logic level, a 0 logic level, and a −1 logic level, wherein said +1 logic level indicates no error.

7. The method of claim 1, wherein:
    oversampling the multi-level error signal comprises sampling the multi-level error signal at four times a symbol rate of the multi-level error signal;
    said de-serializing said sampled symbols to provide said sets of symbols comprises combining groups of eight sampled signals into evaluation windows; and
    filtering said sets of symbols to provide said corresponding output symbols comprises filtering said sets of symbols over said evaluation windows.

8. A receiver for receiving a multi-level error signal having more than two logic levels, comprising:
    an input circuit having a data input for receiving the multi-level error signal, a first clock input for receiving a first clock signal at a first clock rate higher than a symbol rate of the multi-level error signal, and an output for providing sets of symbols at a second clock rate lower than said first clock rate; and
    a filter and alignment circuit having an input coupled to said output of said input circuit, and an output for providing output symbols, said filter and alignment circuit determining a start of a symbol period in response to detecting that a given sampled signal is different from a prior sampled signal, and said prior sampled signal indicates no error, and filtering said sets of symbols to provide corresponding output symbols based on said start of said symbol period.

9. The receiver of claim 8, wherein said filter and alignment circuit filters said sets of symbols by:
    discarding a first symbol at said start of said symbol period and a last symbol at an end of said symbol period; and
    forming a filtered symbol in response to at least one sample between said first symbol and said last symbol.

10. The receiver of claim 9, wherein said filter and alignment circuit forms each of said corresponding output symbols in response to a plurality of symbols between said first symbol and said last symbol.

11. The receiver of claim 10, wherein said filter and alignment circuit further forms said corresponding output symbols as a most severe error indicated by any of said plurality of symbols between said first symbol and said last symbol.

12. The receiver of claim 8, wherein:
    the multi-level error signal is a four-level pulse amplitude modulated (PAM-4) signal having a +3 logic level, a +1 logic level, a −1 logic level, and a −3 logic level, wherein said +3 logic level indicates no error.

13. The receiver of claim 8, wherein:

the multi-level error signal is a three-level pulse amplitude modulated (PAM-3) signal having a +1 logic level, a 0-logic level, and a −1 logic level, wherein said +1 logic level indicates no error.

14. The receiver of claim 8, wherein:

said input circuit oversamples the multi-level error signal at four times a symbol rate of the multi-level error signal to provide sampled symbols, and de-serializes said sampled symbols to provide said sets of symbols by combining groups of eight sampled signals into evaluation windows; and said filter and alignment circuit provides said corresponding output symbols by filtering said sets of symbols over said evaluation windows.

15. A data processing system, comprising:

a data processor; and a memory coupled to the data processor that outputs a multi-level error signal having more than two logic levels in response to detecting an error in a communication with said data processor, wherein said data processor comprises a physical interface circuit coupled to said memory, said physical interface circuit comprising:

input circuit having a data input for receiving the multi-level error signal, a first clock input for receiving a first clock signal at a first clock rate higher than a symbol rate of the multi-level error signal, and an output for providing sets of symbols at a second clock rate lower than said first clock rate; and a filter and alignment circuit having an input coupled to said output of said input circuit, and an output for providing output symbols, said filter and alignment circuit determining a start of a symbol period in response to detecting that a given sampled signal is different from a prior sampled signal in one of said sets of symbols, and said prior sampled signal indicates no error, and filtering said sets of symbols to provide corresponding output symbols based on said start of said symbol period.

16. The data processing system of claim 15, wherein said filter and alignment circuit filters said sets of symbols by:

discarding a first symbol at said start of said symbol period and a last symbol at an end of said symbol period; and forming a filtered symbol in response to at least one sample between said first symbol and said last symbol.

17. The receiver of claim 16, wherein said filter and alignment circuit forms each of said corresponding output symbols in response to a plurality of symbols between said first symbol and said last symbol.

18. The receiver of claim 17, wherein said filter and alignment circuit further forms said corresponding output symbols as a most severe error indicated by any of said plurality of symbols between said first symbol and said last symbol.

19. The receiver of claim 15, wherein:

the multi-level error signal is a four-level pulse amplitude modulated (PAM-4) signal having a +3 logic level, a +1 logic level, a −1 logic level, and a −3 logic level, wherein said +3 logic level indicates no error.

20. The receiver of claim 15, wherein:

the multi-level error signal is a three-level pulse amplitude modulated (PAM-3) signal having a +1 logic level, a 0-logic level, and a −1 logic level, wherein said +1 logic level indicates no error.

* * * * *